Patented June 13, 1950

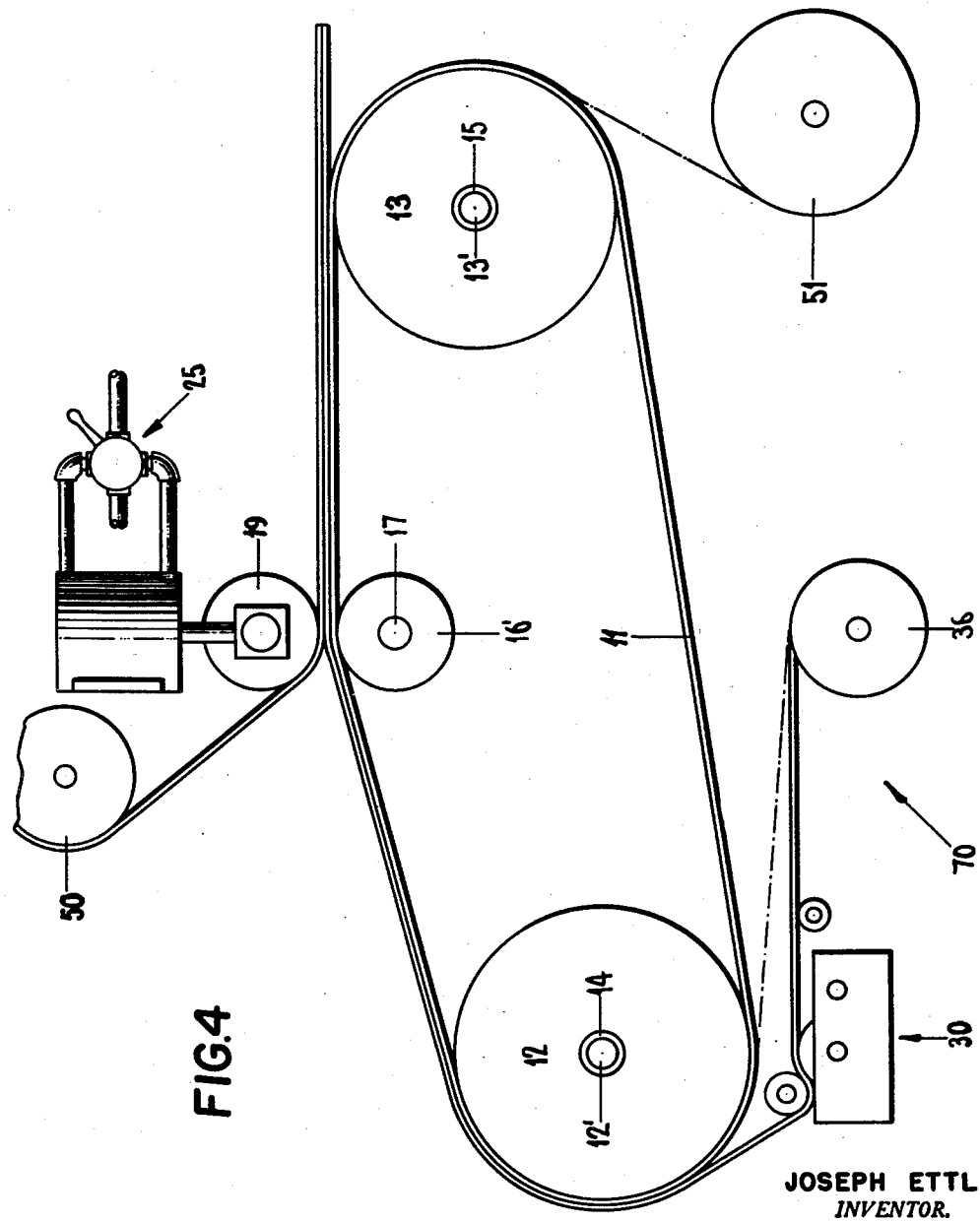

2,511,703

UNITED STATES PATENT OFFICE 2,511,703

ROTARY POLISHING AND LAMINATING MACHINE

Joseph Ettl, Brooklyn, N. Y., assignor to Rogers Industries, Inc., New York, N. Y., a corporation of New York Application July 25, 1947, Serial No. 763,639

9 Claims. (Cl. 154—25)

1

In the formation of laminated plastic sheets, it has been customary to superpose sheets of limited dimensions and to unite them by heat and pressure, the pressure being applied by a reciprocating platen which operates in a slow working cycle of heat and pressure, and then cooling while under pressure which is a very slow process. This method of operation was not suitable for producing continuous webs from rolls.

In the method herewith disclosed, I provide a continuous platen in the form of an endless metallic belt upon which a web is carried, such as thermoplastic material or material coated with thermoplastic, or thermosetting or pressure sensitive material for continuously applying heat and pressure and continuously cooling for separating the laminated or polished materials from the continuous metal belt platen.

The mechanism herewith disclosed basically, may however be implemented with a coacting coating unit whereby it is possible to coat any web material in a continuous manner with any suitable adhesive, cement, or lacquer and combined with any other material.

Among the objects of this invention is to provide a combination comprising a pre-heating drum and a heated roller for jointly heating the plastic material, and, a combination comprising a heating drum acting as the sole means for heating the plastic material and having two unheated superposed pressure rollers.

I may also implement the basic mechanism by polishing under heat and pressure in a continuous manner by feeding the material to be polished from a material supply roll around the endless belt portion on a pre-heating drum, then moving the material away from the metallic belt by passing over a wrinkle and shrinkage eliminating roller, then feeding the material onto the metallic belt at a point where this belt is between a heating roller and a pressure roller to momentarily weld the material to the belt by heat and pressure solely on the line of contact between the rollers, then moving the welded material and belt over a freezing chamber where the heat in the belt and material is dissipated, in order to break the adhesion between the material and the belt and to permit the material to be removed from the belt without damage of the highly polished surface thereon and rewinding on a suitable rewinding mechanism.

I may also utilize the basic mechanism for rapidly glossing or polishing of sheets such as paper, cloth, etc., which are pre-coated with suitable thermoplastic material.

2

I may create a surface finish comparable or superior with that of cellophane or acetate laminations. This I do by coating a sheet and then passing it through the basic process of continuous application of heat and pressure and subsequent continuous freezing to facilitate quick and easy removal of the polished material from the belt by leaving a portion of the sheet at the front edge uncoated and then using a continuous endless vacuum pickup device for separating the polished material from the metallic belt.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 4 is a side elevation of a modified laminating mechanism.

Figure 1:
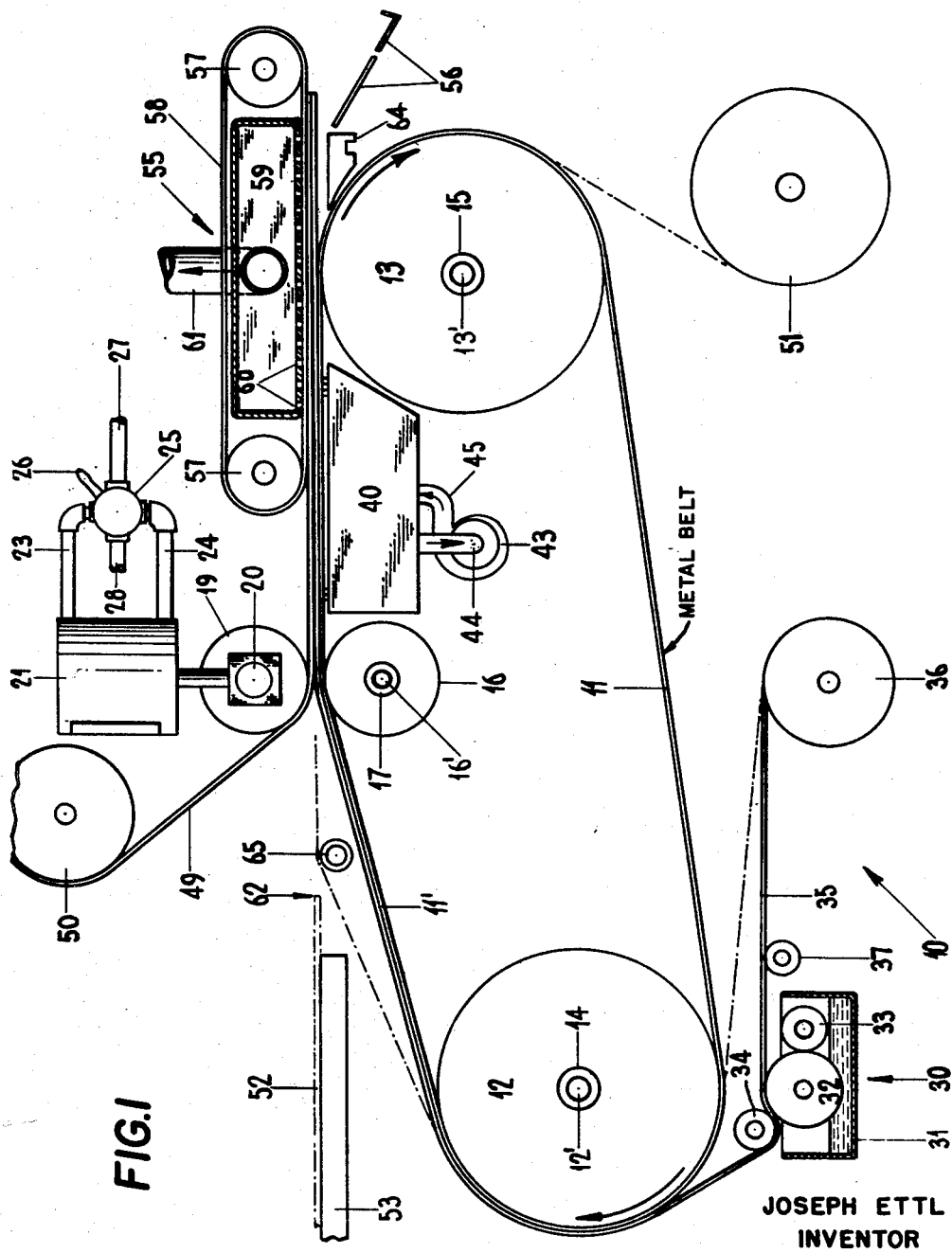
Figure 1 is a side elevation of the continuous laminating mechanism shown in schematic form.
Figure 2:
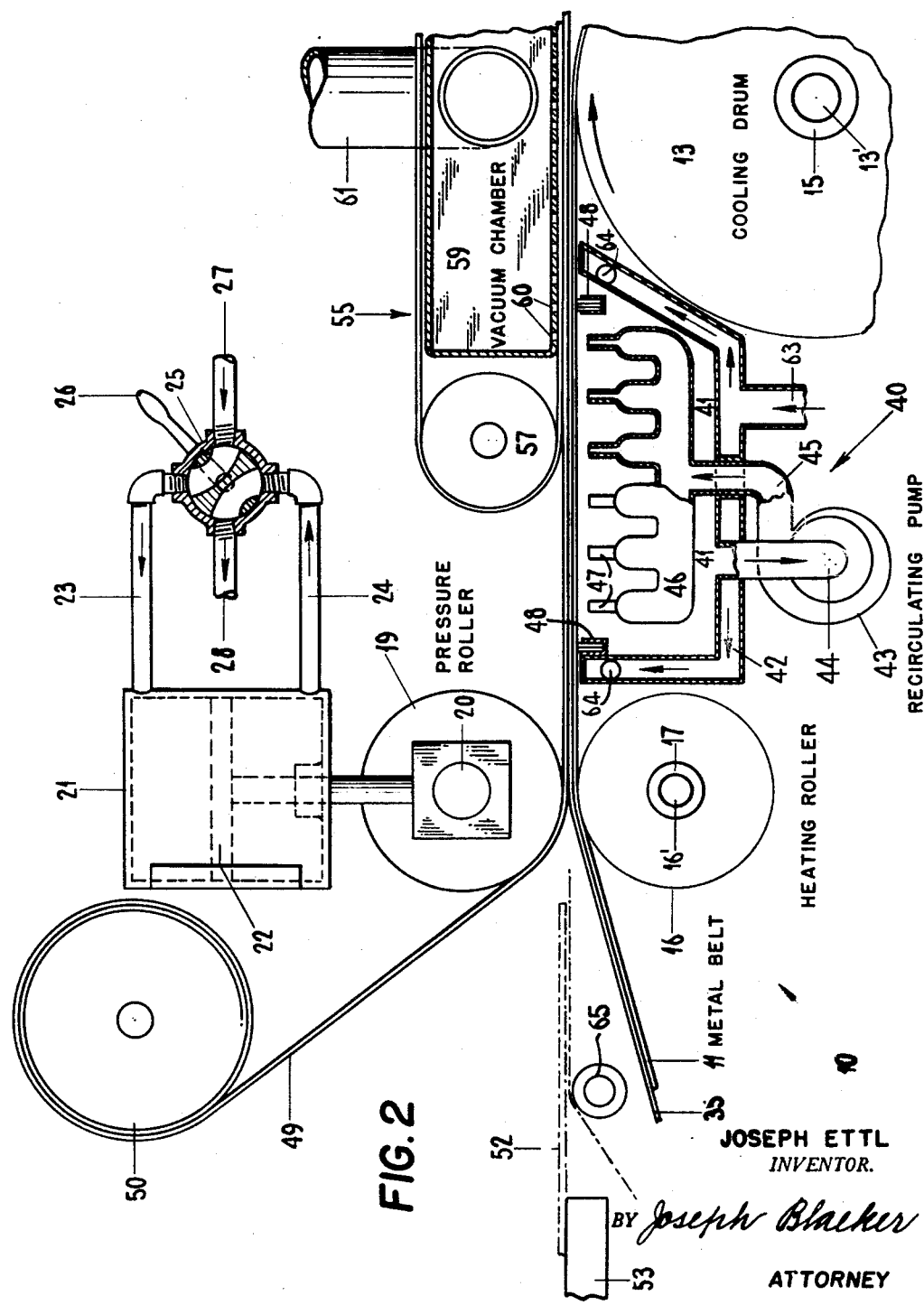
Figure 2 is a side elevation of an enlarged fragmentary portion of the laminating mechanism shown in Figure 1.
Figure 3:
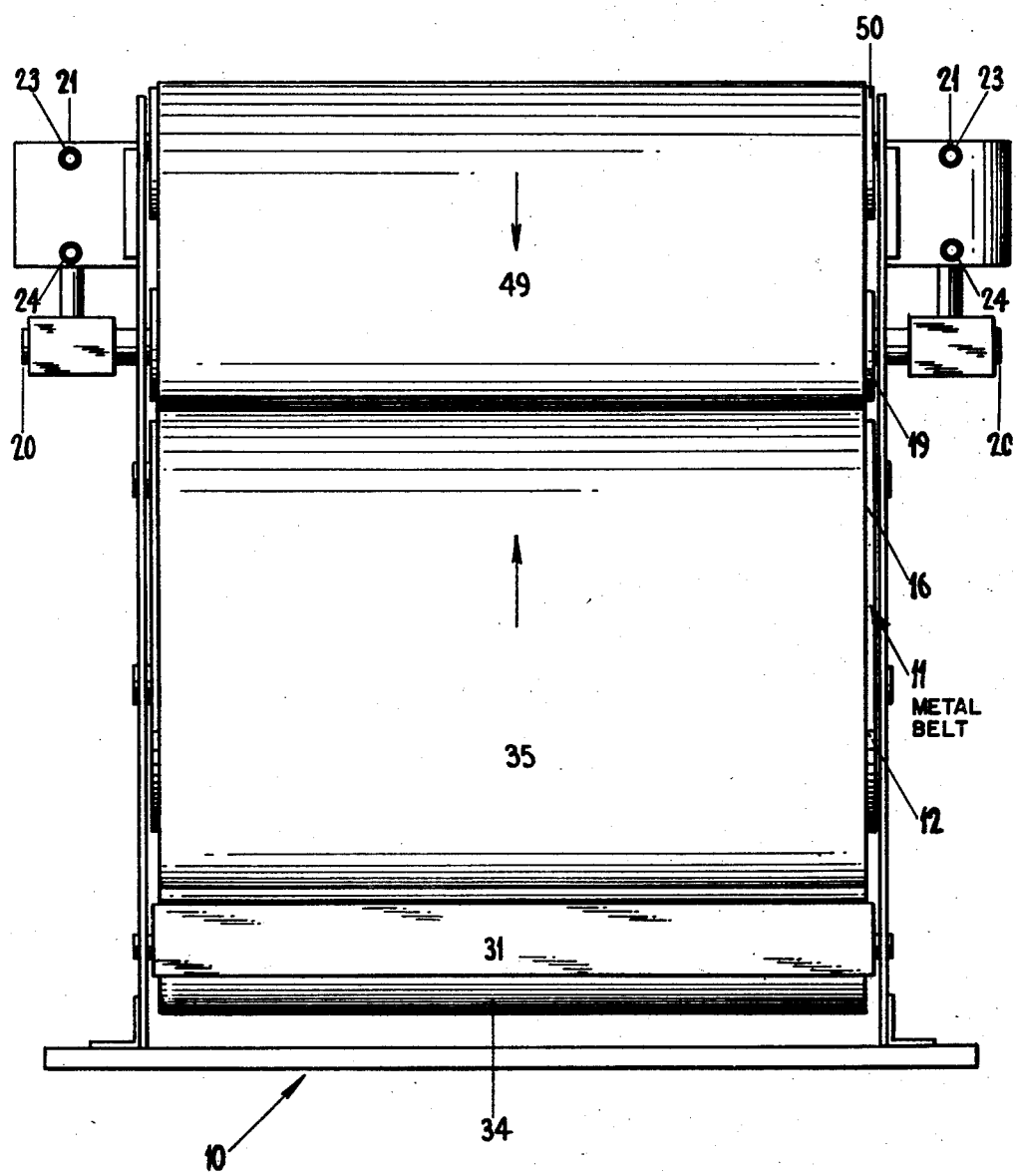
Figure 3 is an end view of the laminating mechanism shown in Figures 1 and 2.

In the illustrated embodiment of the invention, the numeral 10 indicates a mechanism for continuously laminating plastic sheets.

The mechanism 10 comprises an endless metallic belt 11 having one end portion mounted on a pre-heating drum 12 and the opposite end portion on a cooling drum 13. The drum 12 is mounted on rotatable journals 14. The drum 13 is mounted on rotatable journals 15. The drum 12 has a central opening 12' through which an electric heating unit (not shown) and well known in the art, passes and provides heat for the drum 12. I may use gas heating or steam heating inside the drum 12.

The drum 13 has a central opening 13' through which a cooling liquid is passed (not shown) and well known in the art, and cools the drum 13.

A heating roller 16 is mounted on rotatable journals 17 at substantially the midportion of the belt 11. The heating roller 16 is in contacting and supporting relation with the upper layer of the endless belt 11. The heating roller 16 is positioned at an elevation above the drum 12. The roller 16 has a central opening 16' through which an electric heating unit (not shown) and well known in the art, passes and provides heat for the roller 16. I may use gas heating or steam heating inside the roller 16.

The topmost points or points of tangency of the roller 16 and the drum 13 lie in a horizontal plane. The upper layer of the belt 11 comprises a portion 11' which is in angular relation with the portion of the belt lying in the said horizontal plane.

It will thus be seen that there is an angular relation between the belt surface between the pre-heating drum 12 and the heating roller 16, and the belt surface between the heating roller 16 and the cooling drum 13.

A pressure roller 19 is mounted on rotatable journals 20, and in contacting relation with the pre-heating roller 16 through the belt 11. The rollers 16 and 19 are in axial alignment and in linear contact. I provide means for forcing the pressure roller 19 against the upper layer of the belt 11, and against the drum or roller 16.

A form of pressure means for forcing the roller 19 against the pre-heating roller 16 comprises a cylinder 21 and piston 22 operatively reciprocable therein. I provide fluid supply under pressure to the upper portion of the cylinder 21 through a pipe 23 and to the lower portion of the cylinder 21 through a pipe 24.

I also provide a control valve 25, well known in the art, for alternately supplying motive fluid to or exhausting the motive fluid from the upper or the lower portions of the cylinder 21. An operating handle 26 rotates the valve. In the position shown, the handle and the valve are set to permit passage of motive fluid under pressure from a supply pipe 27 to the upper portion of the cylinder through pipe 23, and exhaust from the lower portion of the cylinder 21 through a drain pipe 28. Turning the handle 26 through a ninety degree arc permits the motive fluid to feed to the lower portion of the cylinder through pipe 24 and exhaust from the upper portion of the cylinder through the drain pipe 28.

I provide means for adhesively coating one surface of one of the materials to be laminated. The adhesive applying means 30 preferably comprises a tank 31 in which is rotatably mounted an adhesive applying roller 32 and a doctor roller 33 contacting the adhesive applying roller. I also provide a pressure roller 34 contacting a material 35 from a supply roll 36 and serving to bring the material in contacting relation with the roller 32 whereby a suitable amount of adhesive is applied to the material 35.

I also provide a supporting roller 37 mounted outside the tank 31 and positioned at an elevation above the tank to prevent the material 35 from coming into contact with any part of the adhesive applying mechanism until the material 35 contacts with the adhesive applying roller 32.

For the purpose of effectively cooling a portion of the heated belt 11, I provide a freezing unit 40 comprising an inner chamber 41 and an outer chamber 42 designed to contain two separate cooling liquids positioned in inner and outer relation.

The inner cooling liquid is recirculated by a circulating pump 43 to conserve the liquid. The pump 43 has a suction pipe 44 communicating with the inner chamber 41 and a discharge pipe 45 communicating with a spray nozzle manifold 46 in the chamber 41. It is desirable that the inner cooling liquid should have a boiling point ranging above 350° F. which is approximately the temperature of the metallic belt at the time it enters the cooling chamber.

The manifold 46 is employed to spray fresh cooling liquid to an entire cross-sectional portion of the belt 11 which is exposed to the inner cooling chamber 41. A large number of spray nozzles 47 are employed in practice, for cooling a belt of large width. After the inner cooling liquid is discharged against the heated portion of the belt 11, through the spray nozzles 47, the liquid passes into the inner cooling chamber 41 and into the recirculating pump 43 which forces the liquid again through the same cycle.

At each end, inside the inner cooling chamber 41, I provide knife-edged non-metallic elongated wipers 48 contacting the entire cross-sectional surface of the belt to prevent any liquid from escaping from the inner cooling chamber.

In the outer cooling chamber 42, I circulate a cold water supply. I may use brine and provide a pump (not shown) for recirculating the brine. The circulating liquid in the outer chamber is used to dissipate the heat from the liquid in the inner cooling chamber. The chamber 42 has an inlet 63 and outlets 64.

When the machine 10 is used for laminating a plastic web from a roll 36 to a paper, or cloth, or leather web, etc., 49 from a roll 50, the laminated material is stripped off from the cooling drum 13 and is rewound on a rewinding drum 51 shown in Figure 1.

When laminating a plastic web 35 from the roll 36 to a sheet of paper, cloth, or leather, etc., indicated by the numeral 52, the plastic material from the roll 36 passes in direct contact with the outer surface of the belt 11, under the pre-heating drum 12, then around the pre-heating drum and between the belt 11 and the roller 19.

Simultaneously, the sheet 52 to be laminated, is fed from a table 53 between the belt 11 and the roller 19. A slip sheet, usually a thin web of paper, from the roller 50 is fed on top of the sheet 52 to prevent the plastic material from adhering to the roller 19 in case the sheets 52 are not fed perfectly continuous.

When the laminating of web to sheet is completed, the laminated material passes over the freezing unit 40 where the heat in the belt and in the laminated material is dissipated. The material then passes under an endless belt vacuum pick-up unit 55, where the material is stripped off the metallic belt and deposited on a finished material receiving table 56.

The endless belt vacuum pick-up and delivery unit 55 is used when combining of web to sheet is produced on the machine 10. The unit 55 comprises two rollers 57 upon which is mounted a perforated endless belt 58.

Between the rollers 57 is a vacuum chamber 59 having perforations 60 at the bottom surface only. The inner surface of the belt 58 contacts the lower perforated surface of the vacuum chamber 59.

A suction pipe 61 is connected to the vacuum chamber and suitable means (not shown) is provided whereby the vacuum is continuously effected.

When using the machine 10 for polishing a pre-coated sheet 52 having a dry marginal leading edge 62, the sheet 52 is fed into the machine with the coated surface downward and facing the belt 11 with the dry edge forward.

As the sheet 52 is passed between the pressure rollers 16 and 19, the heat and pressure weld the sheet to the heated metallic belt except for the dry leading edge. When the belt passes over the freezing unit 40, the heat in the belt and in the sheet 52 is dissipated.

The sheet 52 then passes under the vacuum pick-up unit 55, when the dry leading edge of the now polished sheet is picked up by the vacuum suction belt 58 and carried away from the metallic belt 11 to be deposited on the finished material delivery table 56.

A removable stripping device 64 is provided which contacts the outer surface of the belt 11 when working on sheet polishing and sheet laminating. The device 65 is removed when operating on continuous web materials.

I employ a shrinkage and wrinkle eliminating roller 65 when polishing plastic web material 35 from a continuous supply roll 36.

This plastic material 35 from the supply roll 36 passes upwardly into contact with the endless belt 11, without contacting the adhesive applying unit 30. This plastic material then passes around the heating drum 12 and over the shrinkage and wrinkle eliminating roller 65. The plastic material then moves again into contact with the heated endless belt 11 and between the pressure rollers 16 and 19, then follows the belt 11 past the freezing unit 40 and follows the belt 11 around the cooling drum 13 and is then wound upon the rewind roller 51.

The material to be polished, when passing over the heating drum 12 becomes soft enough to adhere to the belt 11 even though it is highly polished on the surface facing the material to be polished. If the material were allowed to travel along with the belt 11 up to a point between the pressure rollers 16 and 19, it would then be subject to a heavier pressure which would tend to create a surplus of material through the action of the high pressure necessary to produce a high polish. This surplus plastic material would then accumulate in front of the pressure roller 19 until sufficient force were produced to lift the pressure roller 19. The surplus material would then go through between the rollers 16 and 19 in the form of a wrinkle.

In order to eliminate the formation of wrinkles, I provide the shrinkage and wrinkle eliminating roller 65 which is positioned away from the belt 11 and approximately midway between the heating drum 12 and the pressure roller 16. This position of the wrinkle eliminating roller 65 permits the plastic material to lose some of the heat acquired while passing over the heating drum 12. This cooling creates a shrinkage of the preheated plastic material which consequently absorbs the surplus material in front of the pressure roller 19.

In the practice where the material passes between a heating roller and an indirectly heated pressure roller, the transference of heat to the plastic material must take place practically instantaneously and the machine must operate at a low speed for proper welding. This arrangement also requires that the heating roller be heated much above the welding temperature of plastic material.

An important phase in the design of the mechanism 10 is in making the heating drum 12 of comparatively large diameter in order to provide a long surface of heating contact for the metal belt and for the plastic material, which is a slow conductor of heat. This arrangement permits the operation of the machine 10 while the heating drum is heated to substantially the low temperature required for welding the plastic material and the belt and plastic material is subjected to a long heating period, and so that the transference of heat to the plastic material takes place over a long period of time. When the heated material reaches the pressure rollers 16 and 19, this laminating can take place at high speed, as shown in Figure 4.

Figure 4 shows a modified form of laminating machine 70 comprising a metal belt 11, a heated front drum 12, a cooling rear drum 13, upper and lower pressure rollers 16' and 19, and material supply rolls 36 and 50. In this modified form of the invention, the heated drum 12 is the sole means for applying heat, the rollers 16' and 19 serving as the sole means for feeding the materials to be laminated.

In accordance with the patent statutes I have described and illustrated the preferred embodiments of my invention, but it will be understood that various changes and modifications can be made therein without departing from the spirit of the invention as defined by the appended claims.

I claim:

1. A mechanism for continuously and quickly polishing and laminating plastic or plastic coated materials, comprising a continuously rotatable endless metal belt, said belt having one end mounted on a plastic web carrying pre-heating drum and the opposite end on a cooling drum, an intermediate rotatable heating drum mounted at substantially the mid portion of said belt and in contacting and supporting relation with the upper layer of said belt, said intermediate heating drum being positioned at an elevation above said pre-heating drum, a pressure roller and means for forcing said roller against the upper layer of said belt and against said intermediate heating drum to weld said plastic web solely on the line of contact between said pressure roller and said intermediate drum, and insulated freezing means contacting an elongated linear portion of the upper layer of said belt between said intermediate heating drum and said cooling drum for cooling a heated portion of said belt.

2. A mechanism for continuously and quickly polishing and laminating rolls of plastic or plastic coated material, comprising a highly polished and continuously rotatable endless metal belt, said belt having one end mounted on a plastic web carrying pre-heating drum and the opposite end on a cooling drum, an intermediate rotatable heating drum mounted at substantially the mid portion of said belt and in contacting and supporting relation with the upper layer of said belt, said intermediate heating drum being positioned at an elevation above said pre-heating drum, a pressure roller and means for forcing said roller against the upper layer of said belt and against said intermediate heating drum to weld said plastic web solely on the line of contact between said pressure roller and said intermediate drum, and insulated freezing means contacting an elongated linear portion of the upper layer of said belt between said intermediate heating drum and said cooling drum for cooling a heated portion of said belt.

3. A mechanism for continuously and quickly polishing and laminating plastic or plastic coated material, comprising a continuously rotatable endless metal belt, said belt having one end mounted on a plastic web carrying pre-heating drum and the opposite end on a cooling drum, an intermediate rotatable heating drum mounted at substantially the mid portion of said belt and in contacting and supporting relation with the upper layer of said belt, said intermediate heating drum being positioned at an elevation above said pre-heating drum, a pressure roller and means for forcing said roller against the upper layer of said belt and against said intermediate heating drum to weld said plastic web solely on the line of contact between said pressure roller and said intermediate drum, means for coating one of said materials for laminating, and freezing means contacting an elongated linear portion of the upper layer of said belt between said intermediate heating drum and said cooling drum for cooling a heated portion of said belt.

4. A mechanism for continuously and quickly polishing and laminating plastic or plastic coated material, comprising a continuously rotatable endless metal belt, said belt having one end mounted on a plastic web carrying pre-heating drum and the opposite end on a cooling drum, an intermediate rotatable heating drum mounted at substantially the mid portion of said belt and in contacting and supporting relation with the upper layer of said belt, said intermediate heating drum being positioned at an elevation above said pre-heating drum, a pressure roller and means for forcing said roller against the upper layer of said belt and against said intermediate heating drum to weld said plastic web solely on the line of contact between said pressure roller and said intermediate drum, means for coating one of said materials for laminating, and freezing means contacting an elongated linear portion of the upper layer of said belt between said intermediate heating drum and said cooling drum for cooling a heated portion of said belt and means for stripping said laminated or polished material away from said metallic belt.

5. A mechanism for continuously and quickly polishing and laminating plastic or plastic coated material, comprising a continuously rotatable endless metal belt, said belt having one end mounted on a plastic web carrying pre-heating drum and the opposite end on a cooling drum, an intermediate rotatable heating drum mounted in contacting and supporting relation with the upper layer of said belt, said intermediate heating drum being positioned at an elevation above said pre-heating drum to cause an angular relation between the belt surface between said pre-heating drum and said heating drum, and the belt surface between said heating drum and said cooling drum, a pressure roller and means for forcing said roller against the upper layer of said belt and against said intermediate heating drum to weld said plastic web solely on the line of contact between said pressure roller and said intermediate drum, means for adhesively coating one of said materials for laminating, freezing means contacting an elongated linear portion of the upper layer of said belt between said intermediate heating drum and said cooling drum for cooling a heated portion of said belt and means for stripping said laminated or polished material away from said metallic belt.

6. A mechanism for continuously and quickly polishing and laminating plastic or plastic coated material, comprising a continuously rotatable endless metal belt, said belt having one end mounted on a plastic web carrying pre-heating drum and the opposite end on a cooling drum, an intermediate rotatable heating drum mounted in contacting and supporting relation with the upper layer of said belt, said intermediate heating drum being positioned at an elevation above said pre-heating drum to cause an angular relation between the belt surface between said pre-heating drum and said intermediate heating drum, and the belt surface between said heating roller and said cooling drum, a pressure roller and means for forcing said roller against the upper layer of said belt and against said intermediate heating drum to apply both heat and pressure to said plastic web solely on the line of contact between said pressure roller and said intermediate drum, means for adhesively coating one of said materials for laminating, freezing means contacting an elongated linear portion of the upper layer of said belt between said intermediate heating drum and said cooling drum for cooling a heated portion of said belt and non-metallic knife-edged means contacting the outer surface of said metallic belt for stripping said laminated or polished material away from said belt.

7. A mechanism for continuously laminating plastic or plastic coated material, comprising an elongated and continuously rotatable endless plastic web carrying metal belt, said belt having its opposite end portions mounted on front and rear drums, an intermediate rotatable heating drum mounted in contacting and supporting relation with the upper layer of said belt, said intermediate heating drum being positioned at an elevation above said front drum to cause an angular relation between the belt surface between said front drum and said heating drum, and the belt surface between said heating drum and said rear drum, a pressure roller and means for forcing said roller against the upper layer of said belt and against said intermediate heating drum to weld said plastic web solely on the line of contact between said pressure roller and said intermediate drum, freezing means contacting a heated elongated linear portion of the upper layer of said belt between said intermediate heating drum and said rear drum for cooling said heated portion, and non-metallic knife-edged means contacting the outer surface of said metallic belt for stripping said laminated material away from said belt.

8. A welding mechanism for continuously laminating plastic or plastic coated materials, comprising an elongated and continuously rotatable endless plastic web carrying metal belt, said belt having its opposite end portions mounted on front and rear drums, an intermediate rotatable heating drum mounted in contacting and supporting relation with the upper layer of said belt, said intermediate heating drum being positioned at an elevation above said front drum to cause an angular relation between the belt surface between said front drum and said heating drum, and the belt surface between said heating drum and said rear drum, a pressure roller and means for adjustably forcing said roller against the upper layer of said belt and against said intermediate heating drum to weld said plastic web solely on the line of contact between said pressure roller and said intermediate drum, whereby the feeding of said materials to be united is solely by welding to said belt, freezing means contacting a heated elongated linear portion of the upper layer of said belt between said intermediate heating drum and said rear drum for cooling said heated portion, and means for stripping said laminated material away from said belt.

9. A welding mechanism for continuously laminating plastic or plastic coated materials, comprising an elongated and continuously rotatable endless plastic web carrying metal belt, said belt having its opposite end portions mounted on front and rear drums, one of said drums being a heated drum, an intermediate rotatable lower pressure roller mounted in contacting and supporting relation with the upper layer of said belt, said intermediate pressure roller being positioned at an elevation above said front drum to cause an angular relation between the belt surface between said front drum and said pressure roller, and the belt surface between said pressure roller and said rear drum, an upper pressure roller and means for adjustably forcing said roller against the upper layer of said belt and against said intermediate pressure drum to weld said plastic web solely on the line of contact between said pressure roller and said intermediate drum, whereby the feeding of said materials to be united is solely by welding to a heated portion of said belt, freezing means contacting a heated elongated linear portion of the upper layer of said belt between said intermediate pressure roller and said rear drum for cooling said heated portion, and means for stripping said laminated plastic material away from said cooled portion of said belt.

JOSEPH ETTL.

REFERENCES CITED

The following references are of record in the file of this patent:

UNITED STATES PATENTS

| Number | Name | Date |
|---|---|---|
| 1,361,970 | Dickey | Dec. 14, 1920 |
| 2,075,735 | Loomis | Mar. 30, 1937 |
| 2,135,763 | Nicholson | Nov. 8, 1938 |
| 2,267,470 | Kabela et al. | Dec. 23, 1941 |
| 2,275,957 | Groff | Mar. 10, 1942 |
| 2,334,485 | Ettl | Nov. 16, 1943 |
| 2,442,443 | Swallow | June 1, 1948 |